(12) United States Patent
Laughlin

(10) Patent No.: US 6,173,611 B1
(45) Date of Patent: Jan. 16, 2001

(54) MHD SENSOR FOR MEASURING MICRORADIAN ANGULAR RATES AND DISPLACEMENTS

(75) Inventor: Darren R. Laughlin, Albuquerque, NM (US)

(73) Assignee: A-Tech Corporation, Albuquerque, NM (US)

( * ) Notice: Under 35 U.S.C. 154(b), the term of this patent shall be extended for 0 days.

(21) Appl. No.: 09/302,949

(22) Filed: Apr. 30, 1999

(51) Int. Cl.$^7$ .............................. G01P 9/00; G01P 15/08
(52) U.S. Cl. ...................... 73/504.05; 73/504.07
(58) Field of Search ................. 73/504.05, 504.07, 73/514.03, 514.05, 514.06, 514.08, 514.09; 310/11; 324/163

(56) References Cited

U.S. PATENT DOCUMENTS

| | | | |
|---|---|---|---|
| 2,753,469 | * 7/1956 | Statham et al. | 310/11 |
| 3,306,113 | * 2/1967 | Tuccinardi | 73/514.03 |
| 4,718,276 | 1/1988 | Laughlin | 73/516 |
| 5,067,351 | 11/1991 | Laughlin | 73/516 |
| 5,176,030 | * 1/1993 | Laughlin | 73/504.07 |
| 5,665,912 | * 9/1997 | Laughlin | 73/504.05 |

* cited by examiner

Primary Examiner—Helen C. Kwok
(74) Attorney, Agent, or Firm—Pollock, Vande Sande & Amernick, RLLP

(57) ABSTRACT

An angular rate sensor which measures submicroradian angular displacements. An MHD sensor is provided having a cylindrical column of conductive fluid, centered about a measurement axis. The magnetic field for the device is generated from permanent magnets and a shunt structure which produces radial magnetic field components through the cylindrical conductive fluid channel. The first electrode contacts an upper end of the cylindrical conductive fluid channel, and a second electrode contacts a lower end of the cylindrical conductive fluid channel. Current produced as a result of an electrostatic potential generated in response to the rotation of the device, flows through a center electrode connecting the first and second electrodes. A transformer winding surrounding the center electrode produces an amplified rate signal from the current flowing between the first and second electrodes.

9 Claims, 6 Drawing Sheets

MHD SENSOR FOR MEASURING MICRORADIAN ANGULAR RATES AND DISPLACEMENTS

BACKGROUND OF THE INVENTION

The present invention relates to angular rate sensors for measuring small angular displacements. Specifically, a self-contained MHD sensor is provided which measures the angular rate of displacement about a central axis from one hertz to 2,000 Hz.

Angular motion sensors are known from U.S. Pat. No. 4,718,276 and U.S. Pat. No. 5,067,351. These angular motion sensors operate by measuring the electric potential produced from the relative motion between a liquid proof mass such as mercury and an outer case due to magnetohydrodynamic effects produced from a magnetic field which is perpendicular to the rotational velocity of the sensor. Angular motion sensors are used in a variety of applications where stabilization of a platform is necessary. By employing three of these sensors along mutually perpendicular axes, it is possible to measure the angular displacement of the platform. In semiconductor microlithography processes, small vibrational displacement to a production surface can cause significant errors between a semiconductor mask and a substrate. The surface can be stabilized if effective measurement of the small displacements which accompany the vibration on the surface are possible. Using these measurements, a restoring force may be applied to the surface. Platform stabilization is also useful in eliminating the effects of angular motion in line of sight imaging systems. Typically, these line of sight imaging systems are comprised of precision gimbles, or fast steering mirrors and are stabilized using gyroscopes. The ability to compensate for the net displacement requires an ability to measure the small angular displacements which produce the instabilities in the imaging system.

Satellite imaging systems also suffer from vibrational forces which are imparted along the optical axis of the imaging system. Due to the resulting angular motion about the optical axis, a blurred image may be observed. Compensation of such image distortion may be effected by measuring the angular motion which occurs during the imaging process, and using a time dependent blurring function derived from the angular motion to correct for image distortion.

Each of these applications requires a sensor which is capable of measuring microradian displacements along one or more axes. Further, in these applications, specifically in satellite imaging processes, space is at a premium and the sensor must be small and not introduce a magnetic moment which would interfere with other equipment.

SUMMARY OF THE INVENTION

It is an object of this invention to provide for a highly accurate small angular displacement rate measurement sensor.

This and other objects of the invention are provided by an angular rate sensor which uses magnetohydrodynamic sensing capabilities. The sensor includes an exterior case made from a material having high magnetic permeability. An insulated cylindrical conductive fluid channel extends along the inside of the case, providing a cylindrical sense channel. The insulated cylindrical channel includes therein a conductive fluid such as mercury which acts as an inertial proof mass. The cylinder of mercury and exterior case can rotate with respect to each other when small angular displacements are imparted to the case.

A permanent magnet structure is provided within the exterior cylindrical case to generate a radial magnetic field which has a component extending perpendicular to a wall of the fluid channel. First and second electrodes are provided at the top and bottom of a cylindrical fluid channel which detect an electric potential generated when relative motion occurs between the exterior case and mercury proof mass in the fluid channel.

The two electrodes are connected together by a conductor which passes through a coil winding. The conductor and coil winding form a transformer, which amplifies the current flowing between electrodes. The coil winding serves as a secondary of the transformer, and the signal produced from the coil windings is amplified and filtered by electronic circuitry to provide a signal representing the angular displacement rate of the sensor.

DESCRIPTION OF THE PREFERRED EMBODIMENTS

Figure 1:
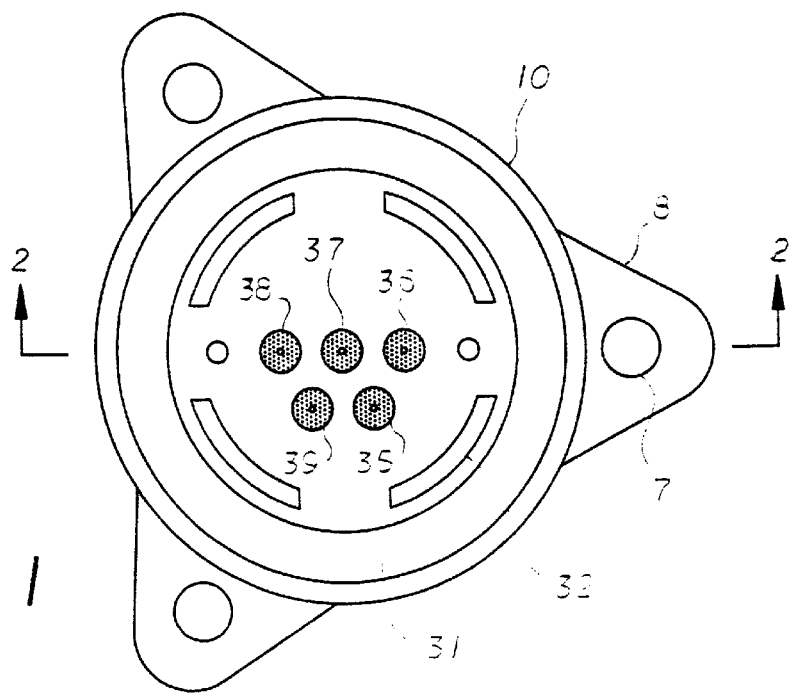
FIG. 1 is a top view of a sensor in accordance with the preferred embodiment.
Figure 2:
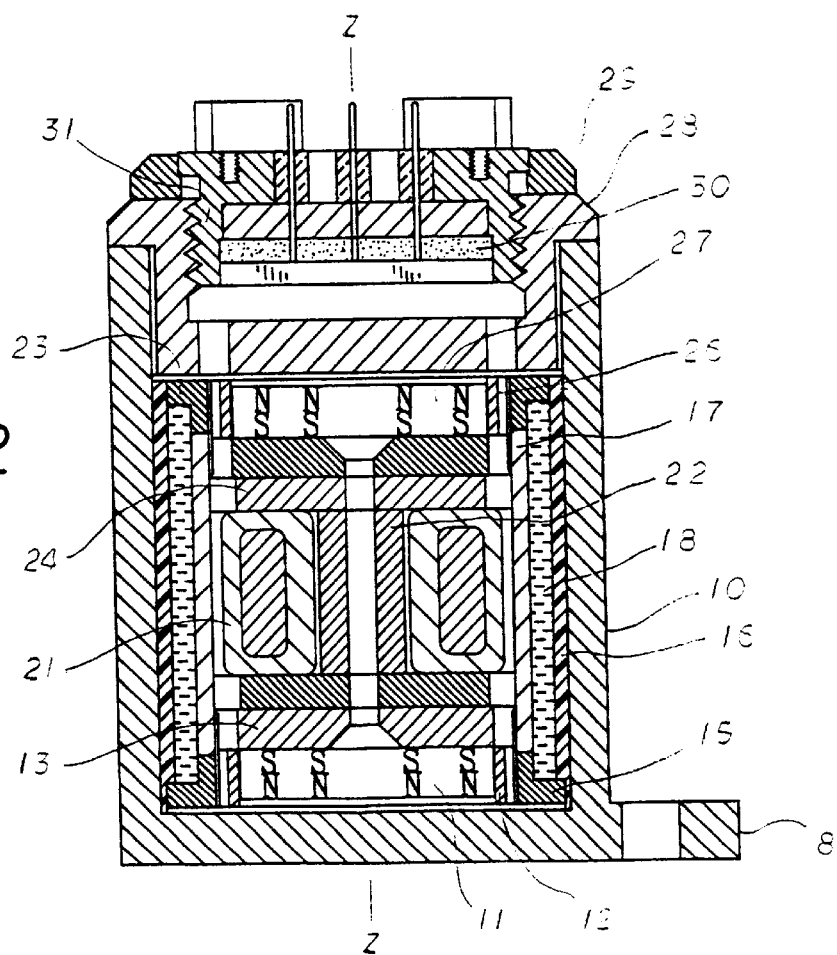
FIG. 2 is a section view of the sensor of FIG. 1.

Referring now to FIGS. 1 and 2, there is shown a top view and section view, respectively, of a microradian rate sensor in accordance with a preferred embodiment. The sensor has a generally cylindrical housing 10, which may be made of 400 series magnetic stainless steel, having high magnetic permeability, which is supported on a base 8 for mounting through mounting holes 7 to a platform. The top of the sensor includes a threaded header 31, also of a high magnetic permeability material, which closes the top of the sensor. Five extending pins, 35 through 39, provide for power supply connections to the electronic circuit board 30 of the sensor, as well as output terminals which produces a voltage proportional to the angular rate of displacement about an axis Z. The header 31 is threaded into the body of the sensor through the use of a plurality of wings 32.

The cylindrical housing 10 supports therein an inner liner 16, which insulates a conductive fluid channel 18 from the surface of cylindrical housing 10. An inner insulating membrane on magnetic shunt 17 separates the conductive fluid in the channel 18 from the shunt 17. Thus, the conductive fluid in the cylindrical channel is insulated from the housing and magnetic shunts, and acts as an inertial mass during rotation of the housing 10 about axis Z. Electrodes 23 and 15 are provided on the top and bottom of the cylindrical conductive fluid channel 18 to sense an electrical potential difference generated across the channel 18.

An internal static magnetic field is generated by permanent magnets 11 and 27, which because a series of magnetic shunts 17, 24 and 13, produce a radial field perpendicular to the cylindrical conductive fluid channel 18. The conductive fluid in channel 18 is preferably mercury. As is conventional in MHD sensors, a magnetic field perpendicular to a conductive fluid in motion produces an electrostatic field along the orthogonal direction, i.e., between the top and bottom of the cylindrical channel 18 along the Z direction.

Figure 3:
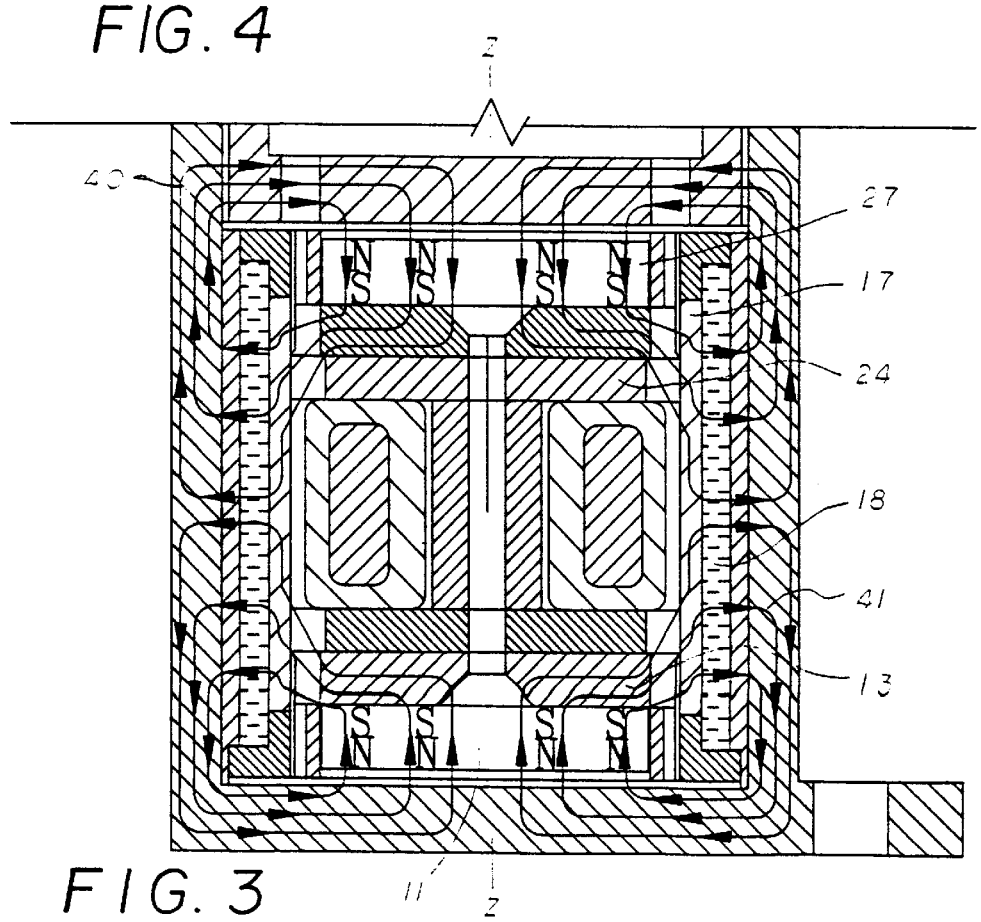
FIG. 3 is a section view of FIG. 1 illustrating the magnetic field generated internal to the sensor.

The magnetic circuit generated by magnets 11 and 27 is shown more particularly in FIG. 3. Referring now to the section view of FIG. 3, magnetic force lines 40 from the upper magnet 27, and magnetic flux lines 41 produced by the lower magnet 11 are shown. Due to the effects of magnetic shunts 13, 17, and 24, the high intensity magnetic field is generated in the radial direction through cylindrical channel 18. Magnets 11, 27 are oriented in an opposite polarity. The opposing magnets create a substantially zero dipole moment sensor. The sensor does not, therefore, produce any external magnetic field which will interfere with other devices.

Figure 4:
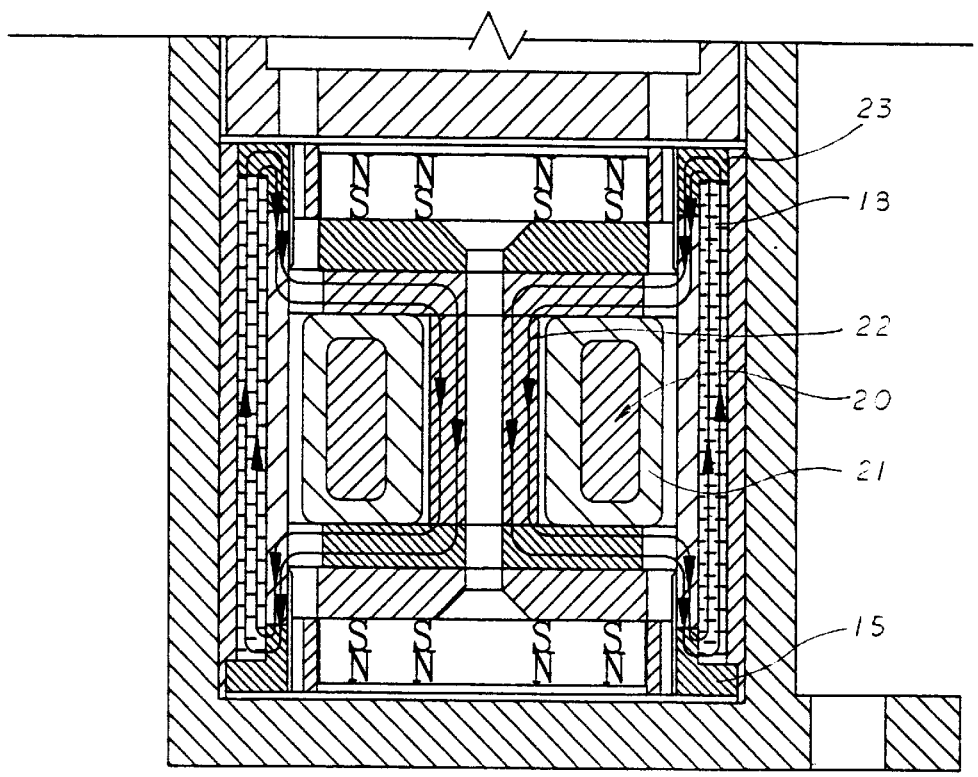
FIG. 4 shows the current flow produced between upper and lower electrodes in response to an angular displacement of the sensor.

The resulting electrical current produced from the electric field generated from rotation of the sensor about axis Z is shown in FIG. 4. Upper electrode 23, in contact with the top of the conductive fluid in channel 18, center electrode 22, and lower electrode 15 in contact with the bottom of the conductive fluid, produce a current flow shown by the arrows. The current flowing through center electrode 22 (which may be silver to enhance conductivity) induces in a plurality of coil windings 21 a measurable voltage potential. Coil windings 21 are wound around a toroid to form a transformer 20 having a primary winding constituted by center conductor 22. The ends of the winding 21, as will be evident from the exploded view of the device of FIG. 5, are brought to the electronic circuit board 30 supported on header 31, where the voltage produced in response to rotation of the sensor is amplified and filtered.

Figure 5:
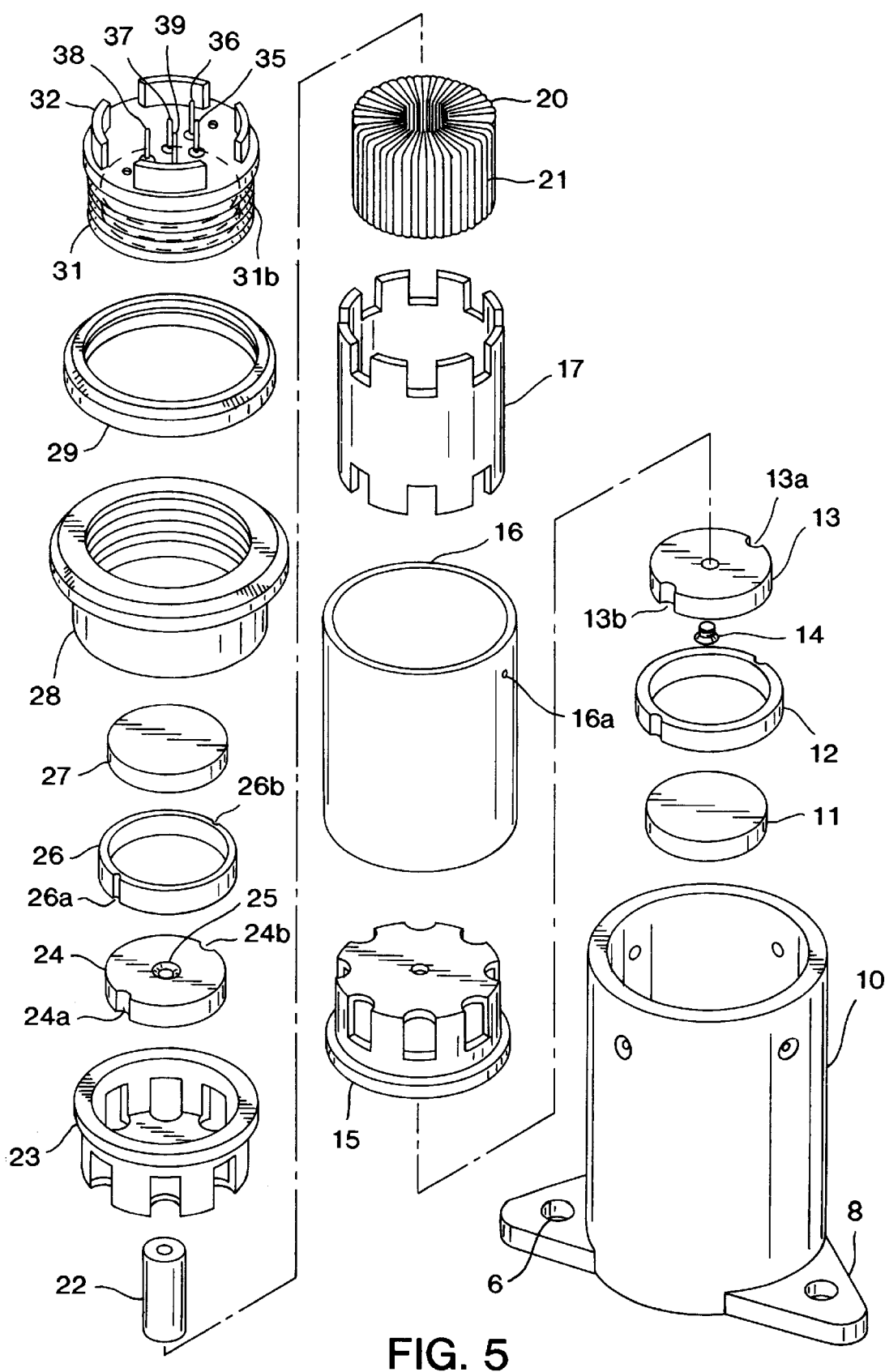
FIG. 5 is an exploded view of a preferred embodiment of the sensor.

An exploded view of the entire device is shown more particularly in FIG. 5. Referring now to FIG. 5, housing 10 receives at the bottom of a cylindrical cavity therein magnet 11 and magnet spacer 12 for centering the magnet with respect to the axis of the cylindrical housing. An assembly comprising magnetic shunt 13, electrode 15, insulating inner liner 16, magnetic shunt 17, magnetic core and transformer assembly 20, center electrode 22, electrode 23 and shunt 24 are initially assembled into a subassembly before placing them within the cylindrical cavity of housing 10. The assembly begins by connecting the shunt 24, with a threaded screw through a hole 25 inside of electrode 23 into a thread within the center electrode 22. The transformer 20, magnetic shunt 17, and electrode 15 are similarly connected together by a threaded screw through shunt 13 to corresponding threads within the end of electrode 22. A thin, approximately 5 mil thick polyimide insulation layer (not shown) is wrapped along the length of shunt 17. The entire subassembly, less the outer fluid inner liner 16, is epoxied as a subassembly. The subassembly is then slid into the inner liner wall 16. The space between the inner liner 16 and the polyimide covered magnetic shunt 17 forms the insulated channel 18 for receiving mercury. A small filler hole 16A is used to fill the space between the inner liner 16 and insulated magnetic shunt 17 with mercury. Once the space is filled, the hole 16A is epoxied closed.

The subassembly, with the inner liner 16 in place is inserted within the cylindrical housing 10 centered over spacer 12, which positions magnet 11 with respect to the cylindrical axis of the housing 10.

The remaining components, including magnet 27 and its corresponding spacer 26 is located above the subassembly with sleeve 28, and spacer 29. These components are also epoxied into place, and leads from the transformer assembly 20 are brought through respective openings in the upper electrode 23, slots 24(*a*) and 24(*b*) of the shunt, slots 26(*a*) and 26(*b*) within the spacer 26, and to the bottom of the sleeve 28, so that they may connect to the electronics on circuit board 30 within header 31. Header 31 is thereafter threaded into the sleeve 28, to complete the total assembly.

Figure 6:
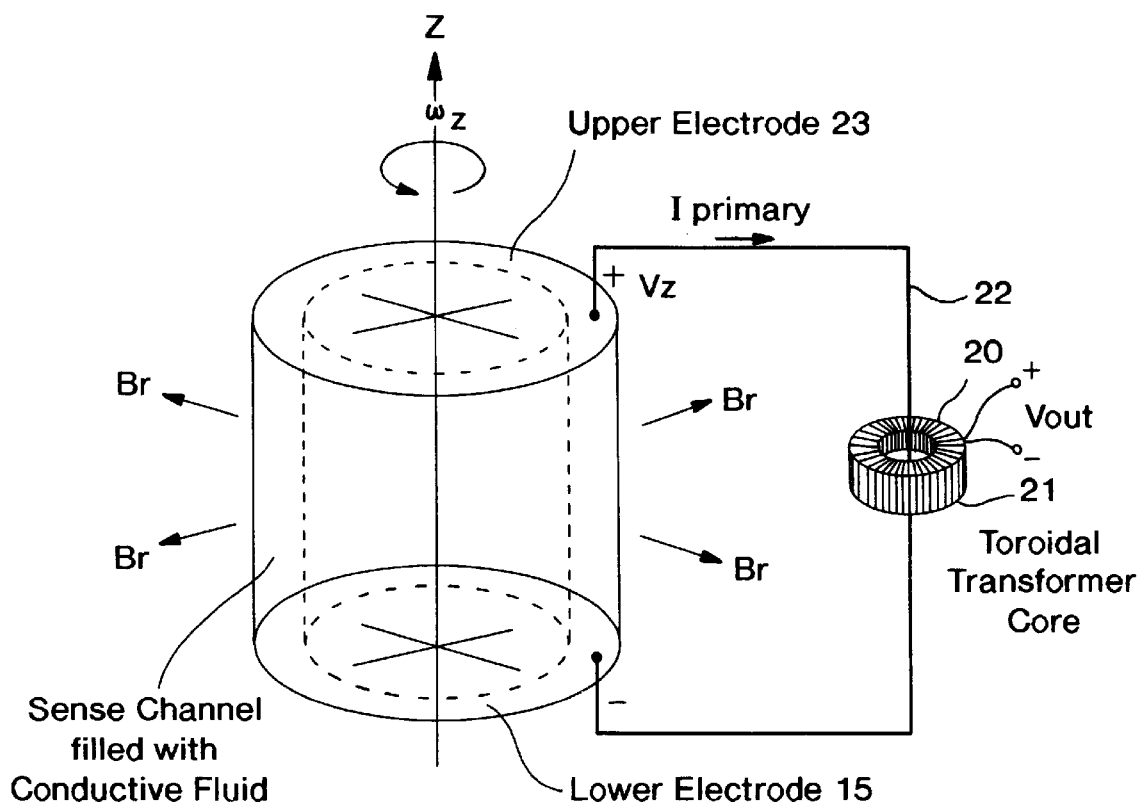
FIG. 6 is an illustration of the functional circuit provided by the sensor.

FIG. 6 illustrates the principal of operation for the sensor of the preferred embodiment. Magnetic field Br, radial to a cylinder of mercury, or other conductive liquid, produces a voltage Vz at ends of the cylinder, in response to rotation of the sensor about the Z axis. The single center electrode 22 carries the current produced by voltage Vz through the center of a toroidal transformer having winding 21 which constitutes a secondary winding, amplifying by the turns ratio represented by winding 21 and center electrode 22, the voltage Vz to a quantity measurable by standard electronic amplification circuitry.

The voltage potential Vz represents the result of an electric field Ez which is generated in the axial or Z direction of the device. The electric field Ez can be more particularly described as:

$$Ez = U\phi \times Br$$

where $U\phi$ is the relative velocity of the conductive fluid with respect to the outer case, and Br is the radial component of the magnetic flux generated inside the case. The relative velocity in the circumferential direction $U\phi$ is approximated by:

$$U\phi(t) = \omega(t) * r_{rms}$$

where $\omega(t)$ is the relative angular velocity, and $r_{rms}$ is the root mean square radius of the sense channel defined as:

$$r_{rms} = \sqrt{((r_{OD}^2 + r_{ID}^2)/2)}$$

The voltage, generated between the upper and lower electrodes, contacting the upper and lower ends of the mercury cylinder, can be represented by $$V_z(t) = -\int Ez(z,t) dz$$

The time-varying channel voltage $V_z(t)$ generated between the electrodes can therefore be represented as a function of the angular velocity $\omega_z(t)$ as follows:

$$V_z(t) = B_r r_{rms} l_z \omega_z(t)$$

where $B_r$ is the average radial field, $r_{rms}$ is the root mean square channel radius, and $l_z$ is the separation distance between the upper and lower electrodes, and $\omega_z(t)$ is the relative angular rate for the sensor. the voltage $V_z$ is amplified by transformer 20.

The sensor in accordance with the foregoing has a frequency response function which can be written, in the La Place function as:

$$H_\omega(s) = \frac{Ks^2}{D_4 s_4 + D_3 s_3 + D_2 s_2 + D_1 s_1 + D_0}$$

$$K = \frac{L_{12}}{L_1} B_0 r_{RMS} l_Z \text{ and}$$

$$D_0 = \frac{R_1}{L_1}\left[\frac{v}{h^2}(1 + M^2)\right]$$

where M is the Hartmann number $$M = \frac{B_0 h}{\sqrt{\eta \rho v}}$$

$$D_1 = \frac{R_1}{L_1} + \frac{vC_2}{h^2}\left(\frac{R_1 R_2}{L_1} + \frac{1}{C_2}\right) + \frac{B_0^2 C_2 l_Z R_2}{A_\rho L_1}$$

$$D_2 = 1 + \frac{C_2 R_1 R_2}{L_1} + \frac{vC_2}{h^2 L_1}(R_1 L_2 + R_2 L_1) + \frac{B_0^2 l_Z L_2 C_2}{A_\rho L_1}$$

$$D_3 = C_2\left[\frac{L_2}{L_1} R_1 + R_2 + \frac{v}{h^2}\left(L_2 - \frac{L_{12}^2}{L-1}\right)\right]$$

$$D_4 = c_2\left[L_2 - \frac{L_{12}^2}{L_1}\right]$$

Where,
Bo is the radial magnetic flux density in Tesla
L1 is the primary winding inductance in Henries
L2 is the secondary winding inductance in Henries
L12 is the primary-secondary winding mutual inductance in Henries
R1 is the prim ary winding resistance in Ohms
R2 is the secondary winding resistance in Ohms
C2 is the secondary winding capacitance in Farads
$l_z$ is the effective channel length in meters
v is the kinematic viscosity in meters squared per second
η is the resistivity of the conductive fluid in Ohm-meters
ρ is the volumetric density of the conductive fluid in kilograms per cubic meter; and
h is the effective channel thickness in meters.

Figure 7:
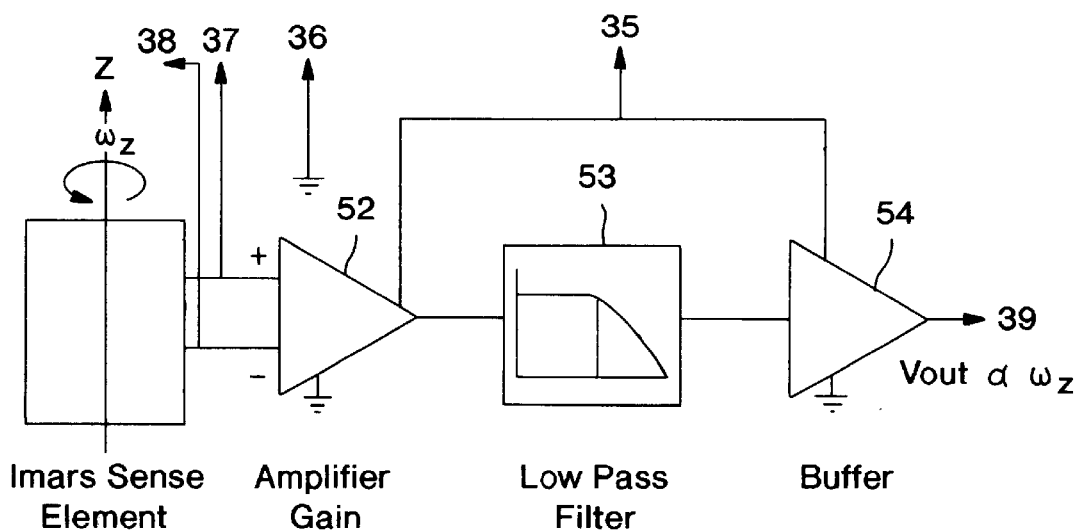
FIG. 7 is a block diagram of the electronic circuit contained within the header of a preferred embodiment.

The electronic circuit board 30 within the header 31, shown in the block diagram of FIG. 7, provides both amplification and low pass filtering of the amplified signal. An amplifier 52 and low pass filter 53 shape the amplitude response, to roll off at approximately 1,000 Hz. A buffer amplifier 54 is used to provide additional gain to the filtered signal.

The pins 35, 36 carried by the header 32 provide for operating voltage to the amplifier and buffer 52 and 54, as well as a common terminal and a signal output terminal 39. Additionally, the direct sensor output from the transformer winding 21 is available through remaining pins 37 and 38 of the header.

Figure 8:
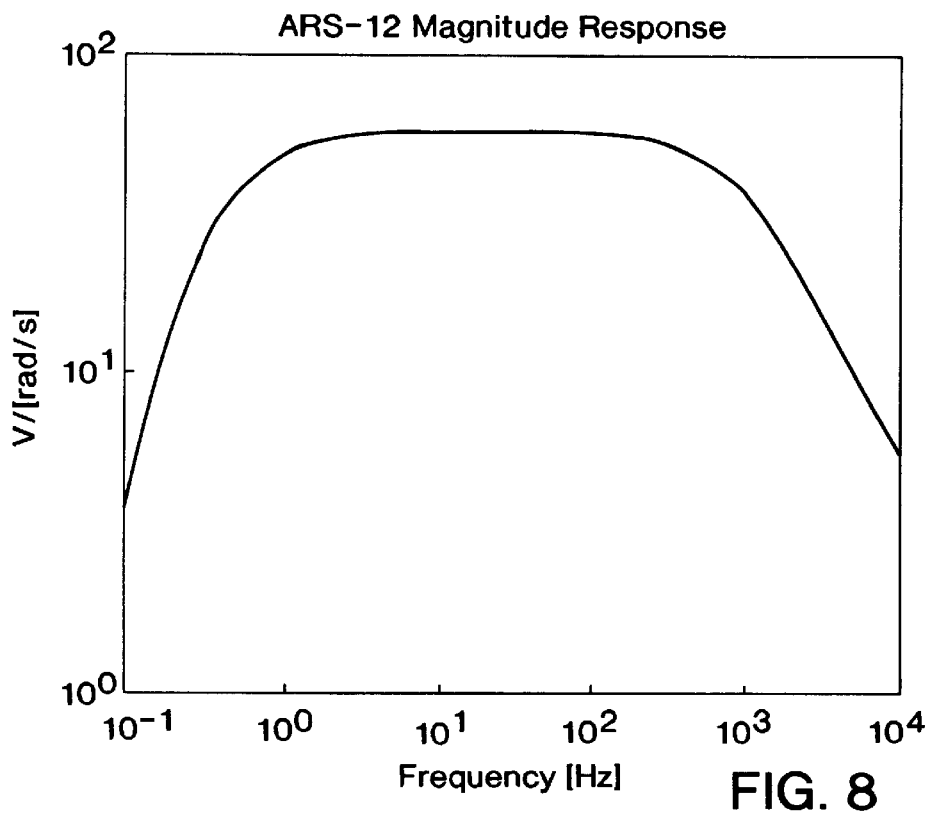
FIG. 8 is a representation of the amplitude response of the sensor of FIG. 1 over its useful bandwidth.
Figure 9:
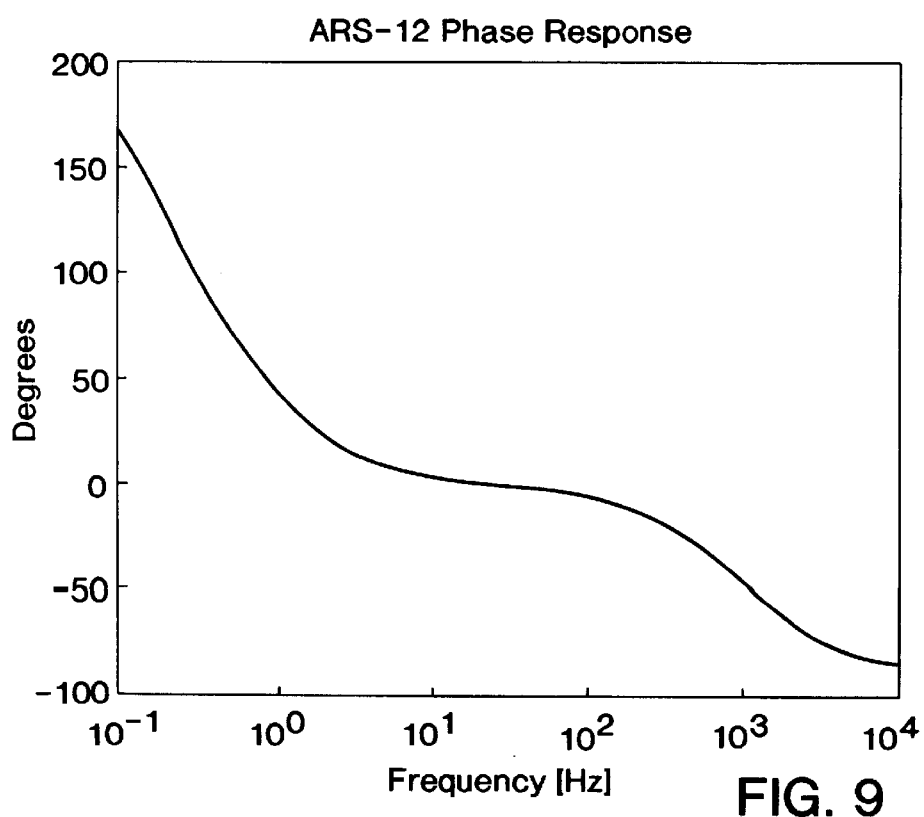
FIG. 9 is an illustration of the phase response for the sensor according to FIG. 1 over its useful frequency range.

FIGS. 8 and 9 show the frequency response of the device to angular displacements. FIG. 8 represents the amplitude response over the bandwidth of a 1/10 of a Hz to 10,000 Hz, and FIG. 9 shows the corresponding phase response over the same bandwidth. The device, as is evident by the frequency response of FIGS. 8 and 9, is very useful for measuring displacements from the 1 Hz to 1,000 Hz frequency range, about the measurement axis Z.

Figure 10:
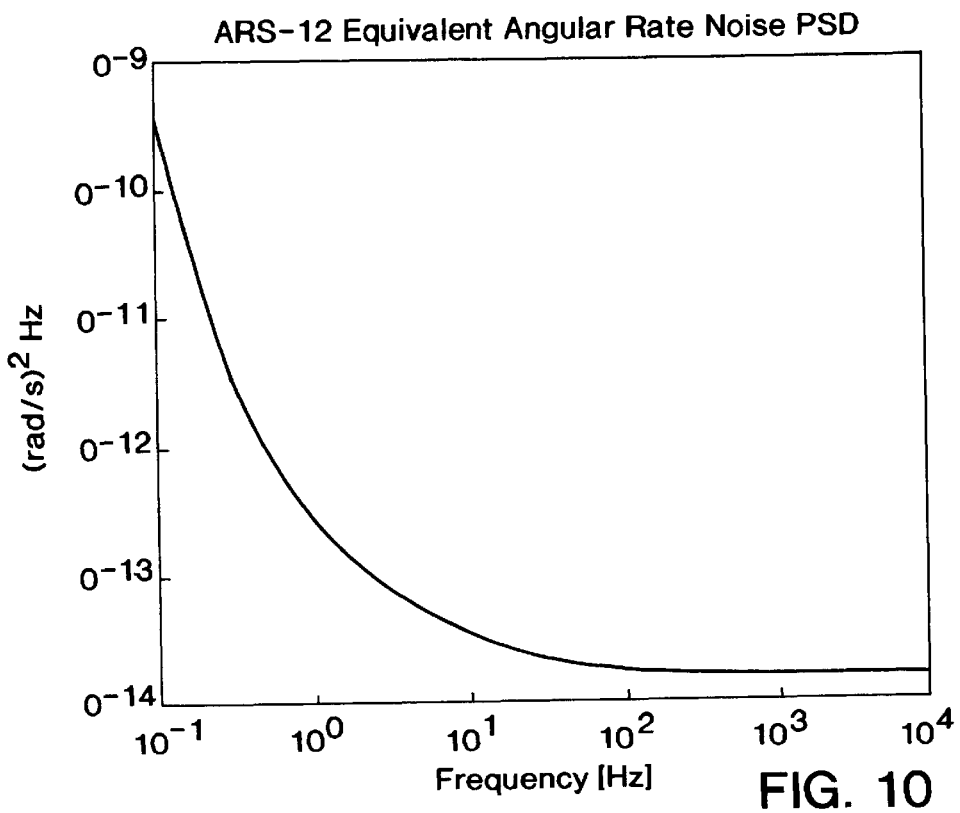
FIG. 10 illustrates the equivalent angular rate noise power spectral density for the sensor in accordance with the preferred embodiment.

The sensitivity of the device is represented by the equivalent angular rate noise power of FIG. 10. FIG. 10 illustrates the ability of the device to produce less than 100 nanoradians (RMS) of noise equivalent angle from 1 to 1,000 Hz, making the sensor out perform many precision gyroscopes that are used for angular rate measurements in this frequency range.

Figure 11:
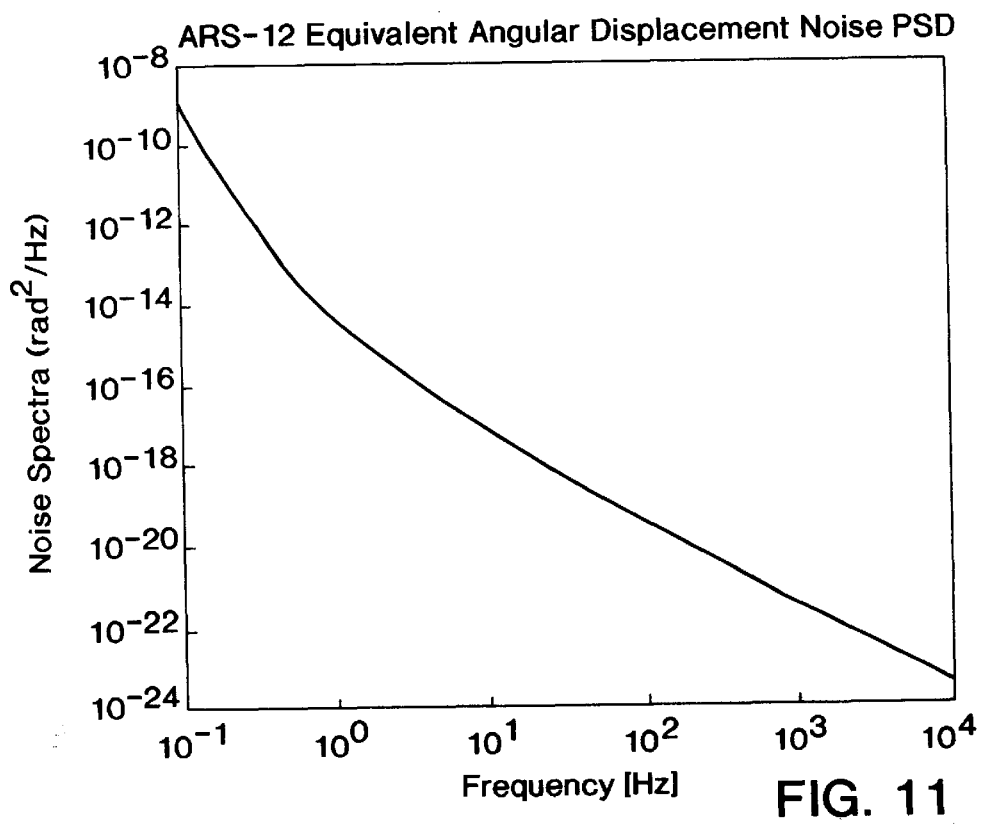
FIG. 11 represents the equivalent angular displacement noise power spectral density for the sensor of FIG. 1.

FIG. 11 represents the noise spectrum as a function of rotational frequency about the Z axis for the device, which will also be recognized as providing superior performance to any type of high precision rate gyroscopes which are used in angular rate measurements.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An angular rate sensor comprising:
    an exterior cylindrical case of high magnetic permeability;
    an insulated cylindrical conductive fluid channel extending along an inside circumference of said exterior cylindrical case;
    a first electrode in contact with an upper end of said cylindrical conductive fluid channel;
    a second electrode in contact with a lower end of said cylindrical conductive fluid channel;
    a center electrode connecting said first and second electrodes along an axis of said exterior cylindrical case;
    magnet means for generating a magnetic field having a substantially radial field component which extends into said fluid channel, producing an electrostatic field across said first and second electrodes in response to motion of said case and said cylindrical fluid channel; and
    a transformer winding surrounding said center electrode for producing an amplified rate signal from a current flowing between said first and second electrodes.

2. The angular rate sensor according to claim 1 wherein said magnet means comprises first and second magnets on opposite ends of said cylindrical case.

3. The angular rate sensor according to claim 2 wherein said magnet means further comprises magnetic shunt means for creating first and second radial magnetic field components extending into said cylindrical conductive fluid channel.

4. The angular rate sensor acording to claim 1 further comprising a header for closing a first end of said cylindrical case, said header supporting thereon amplification circuitry having an input connected to said transformer winding, and at least one output terminal extending throughout said header.

5. The angular rate sensor according to claim 1 wherein said winding is wound about a toroid core which surrounds said center electrode.

6. An angular rate sensor comprising:
    a cylindrical casing having a high magnetic permeability;
    a cylindrical fluid channel along an inner circumference of said cylindrical casing containing a conductive fluid;

a first electrode in contact with one end of said cylindrical channel;

a second electrode in contact with a second end of said cylindrical channel;

magnet means for producing a magnetic field having a radial component which extends through said conductive fluid; and means for sensing a voltage potential between said first and second electrodes produced in response to rotation about a cylindrical channel axis.

7. The angular rate sensor according to claim 6 wherein said means for sensing a voltage potential includes a transformer in said cylindrical casing having a primary winding connected between said first and second electrodes.

8. The angular rate sensor according to claim 7 further comprising:

electronic amplification circuitry contained within said cylindrical casing connected to pins extending through a header closing one end of said cylindrical casing.

9. The angular rate sensor according to claim 6 wherein said magnet means comprises:

a pair of magnets at opposite ends of said cylindrical casing, connected together with a plurality of magnetic shunts, said shunts, said magnets and said cylindrical casing producing first and second magnetic paths which extend through said cylindrical fluid channel.

* * * * *